US012683977B2

(12) United States Patent
  May

(10) Patent No.:   US 12,683,977 B2
(45) Date of Patent:   *Jul. 14, 2026

(54) SYSTEMS AND METHODS FOR IDENTIFYING SECURITY REQUIREMENTS IN A ZTNA SYSTEM

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/817,521

(22) Filed: Aug. 28, 2024

(65) Prior Publication Data

US 2024/0422171 A1     Dec. 19, 2024

Related U.S. Application Data

(63) Continuation of application No. 17/958,608, filed on Oct. 3, 2022, now Pat. No. 12,149,540.

(51) Int. Cl.
   *H04L 9/40*        (2022.01)

(52) U.S. Cl.
   CPC ................................. H04L 63/108 (2013.01)

(58) Field of Classification Search
   CPC ............................ H04L 63/108; H04L 63/101
   See application file for complete search history.

(56) References Cited

U.S. PATENT DOCUMENTS

| | | | |
|---|---|---|---|
| 10,320,813 B1 | 6/2019 | Ahmed | |
| 11,456,894 B1 | 9/2022 | Sundararajan | |
| 11,546,257 B1 | 1/2023 | Gupta | |
| 11,563,601 B1 | 1/2023 | K S | |
| 11,663,030 B2 | 5/2023 | Kaimal et al. | |
| 11,909,826 B1 | 2/2024 | May | |
| 12,149,540 B2 * | 11/2024 | May | H04L 63/108 |
| 2006/0020698 A1 | 1/2006 | Whipple | |
| 2006/0026682 A1 | 2/2006 | Zakas | |
| 2007/0061575 A1 | 3/2007 | Bennett | |
| 2007/0091861 A1 | 4/2007 | Gupta | |
| 2016/0006661 A1 | 1/2016 | Wei | |
| 2016/0218947 A1 | 7/2016 | Hughes | |
| 2018/0032372 A1 | 2/2018 | Devendran | |
| 2018/0103010 A1 | 4/2018 | Diaz | |
| 2019/0207844 A1 | 7/2019 | Kodavanty | |
| 2020/0014615 A1 | 1/2020 | Michael | |
| 2020/0296026 A1 | 9/2020 | Michael | |
| 2020/0382537 A1 | 12/2020 | Compton | |
| 2021/0234860 A1 | 7/2021 | Bansal | |
| 2021/0258186 A1 * | 8/2021 | Tokunaga | H04L 12/40039 |
| 2021/0281576 A1 | 9/2021 | Sharavan | |
| 2021/0377109 A1 | 12/2021 | Shrivastava | |
| 2021/0409275 A1 | 12/2021 | Galchenko | |

(Continued)

FOREIGN PATENT DOCUMENTS

| | | |
|---|---|---|
| WO | 2012164336 A1 | 12/2012 |

OTHER PUBLICATIONS

U.S. Appl. No. 17/958,616, filed Oct. 3, 2022.

(Continued)

*Primary Examiner* — Thaddeus J Plecha
(74) *Attorney, Agent, or Firm* — Jaffery Watson Hamilton & DeSanctis LLP

(57)          ABSTRACT

Various embodiments provide systems and methods for providing security in a ZTNA system.

19 Claims, 6 Drawing Sheets

(56)     References Cited

U.S. PATENT DOCUMENTS

| 2022/0029988 | A1 | 1/2022 | Levin |
| 2022/0052928 | A1 | 2/2022 | Sundararajan |
| 2022/0150134 | A1 | 5/2022 | Ewert |
| 2022/0209990 | A1 | 6/2022 | Dillon |
| 2022/0329565 | A1 | 10/2022 | Jiang |
| 2022/0345491 | A1 | 10/2022 | Luo |
| 2023/0017423 | A1 | 1/2023 | Guntupalli |
| 2023/0028872 | A1 | 1/2023 | Ramaswamy |
| 2023/0171280 | A1* | 6/2023 | Bansal ................ H04L 63/0815 |
| | | | 726/25 |
| 2023/0188505 | A1 | 6/2023 | Jensen |
| 2023/0254141 | A1* | 8/2023 | Hudon-Voyer ......... H04L 67/06 |
| | | | 713/168 |
| 2024/0154938 | A1 | 5/2024 | Wu |

OTHER PUBLICATIONS

Office Action for U.S. Appl. No. 17/980,232 mailed Nov. 7, 2024, 9 pages.
Notice of Allowance for U.S. Appl. No. 17/980,232 mailed Jan. 16, 2026, 8 pages.
Syed, et al., Zero Trust Architecture (ZTA): A Comprehensive Survey, Jan. 2022NPL_.
Office action for U.S. Appl. No. 17/980,232 mailed Aug. 27, 2025, 13 pages.

* cited by examiner

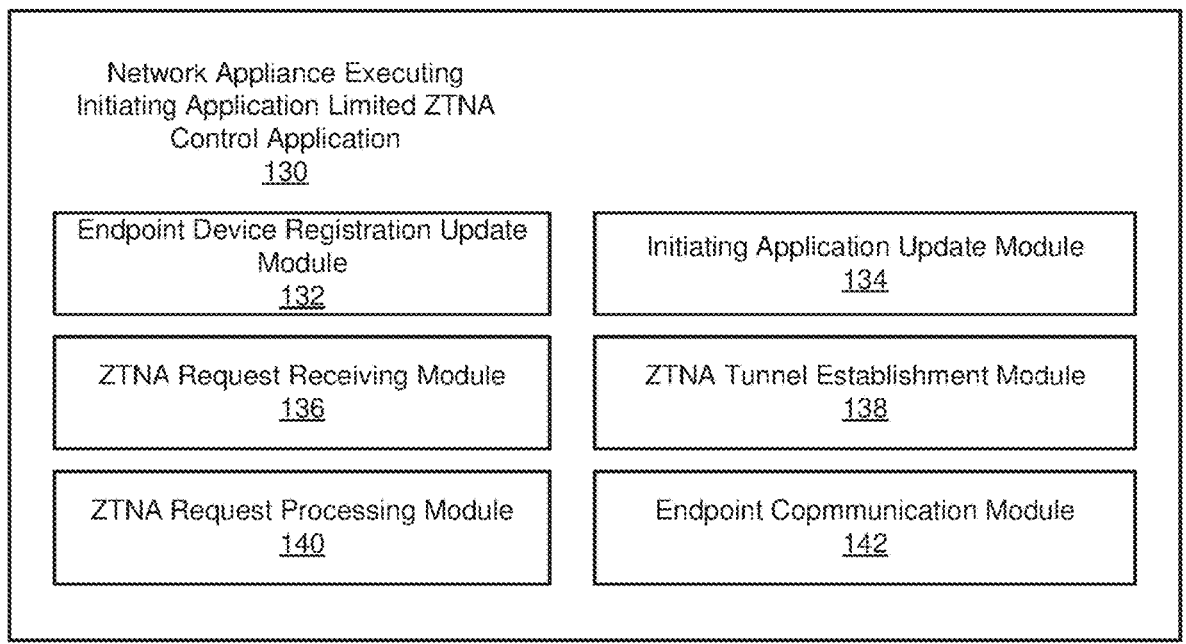

Network Appliance Executing
Initiating Application Limited ZTNA
Control Application
130

| Endpoint Device Registration Update Module 132 | Initiating Application Update Module 134 |
| ZTNA Request Receiving Module 136 | ZTNA Tunnel Establishment Module 138 |
| ZTNA Request Processing Module 140 | Endpoint Copmmunication Module 142 |

FIG. 1B

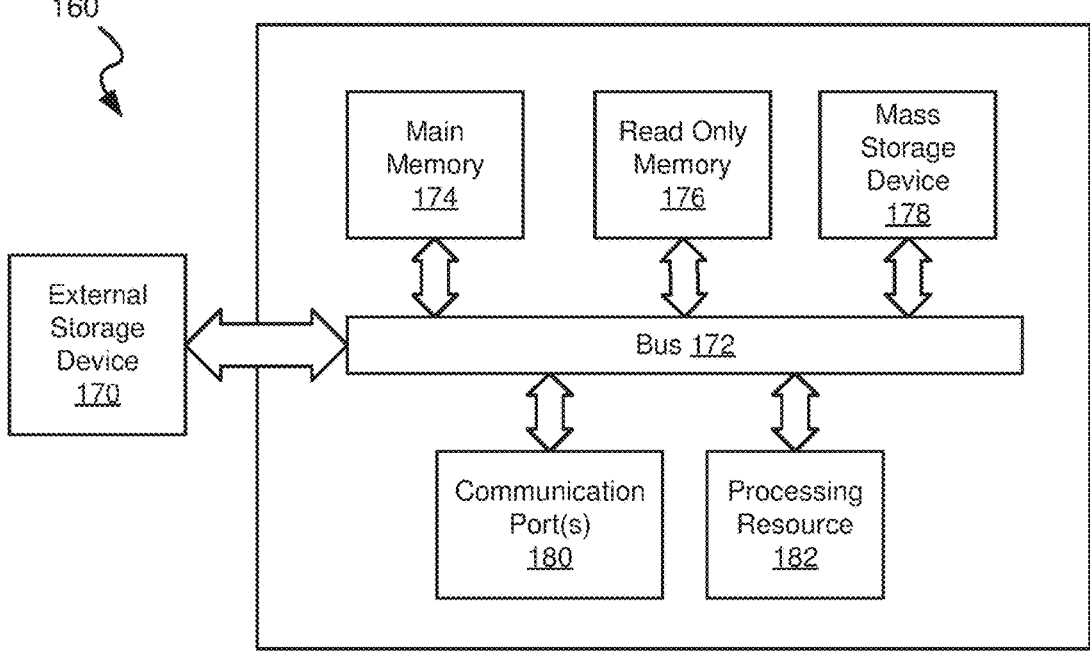

160

| External Storage Device 170 | Main Memory 174 | Read Only Memory 176 | Mass Storage Device 178 |

Bus 172

Communication Port(s) 180    Processing Resource 182

SYSTEMS AND METHODS FOR IDENTIFYING SECURITY REQUIREMENTS IN A ZTNA SYSTEM

CROSS REFERENCE TO RELATED APPLICATIONS

The present application is a continuation of U.S. patent application Ser. No. 17/958,608, filed Oct. 3, 2022, which is hereby incorporated by reference in its entirety for all purposes.

FIELD

Embodiments discussed generally relate to systems and methods for securing network access, and more particularly to systems and methods for providing security in a ZTNA system.

BACKGROUND

Zero Trust Network Access (ZTNA) is a communication protocol that allows only a limited number of pre-defined source nodes to access a network. Implementing such a ZTNA approach offers a significant improvement in security compared to standard firewall approaches that generally allow access limited only to some indication of a potential threat. While such a ZTNA approach offers heightened security, hackers are always working to exploit weaknesses.

Hence, there exists a need in the art for advanced approaches for enhancing security of a ZTNA network communication.

SUMMARY

Various embodiments provide systems and methods for providing security in a ZTNA system.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 1A-1C illustrate a network architecture including a network access application and an application limited ZTNA control application.

DETAILED DESCRIPTION

Figure 1A:
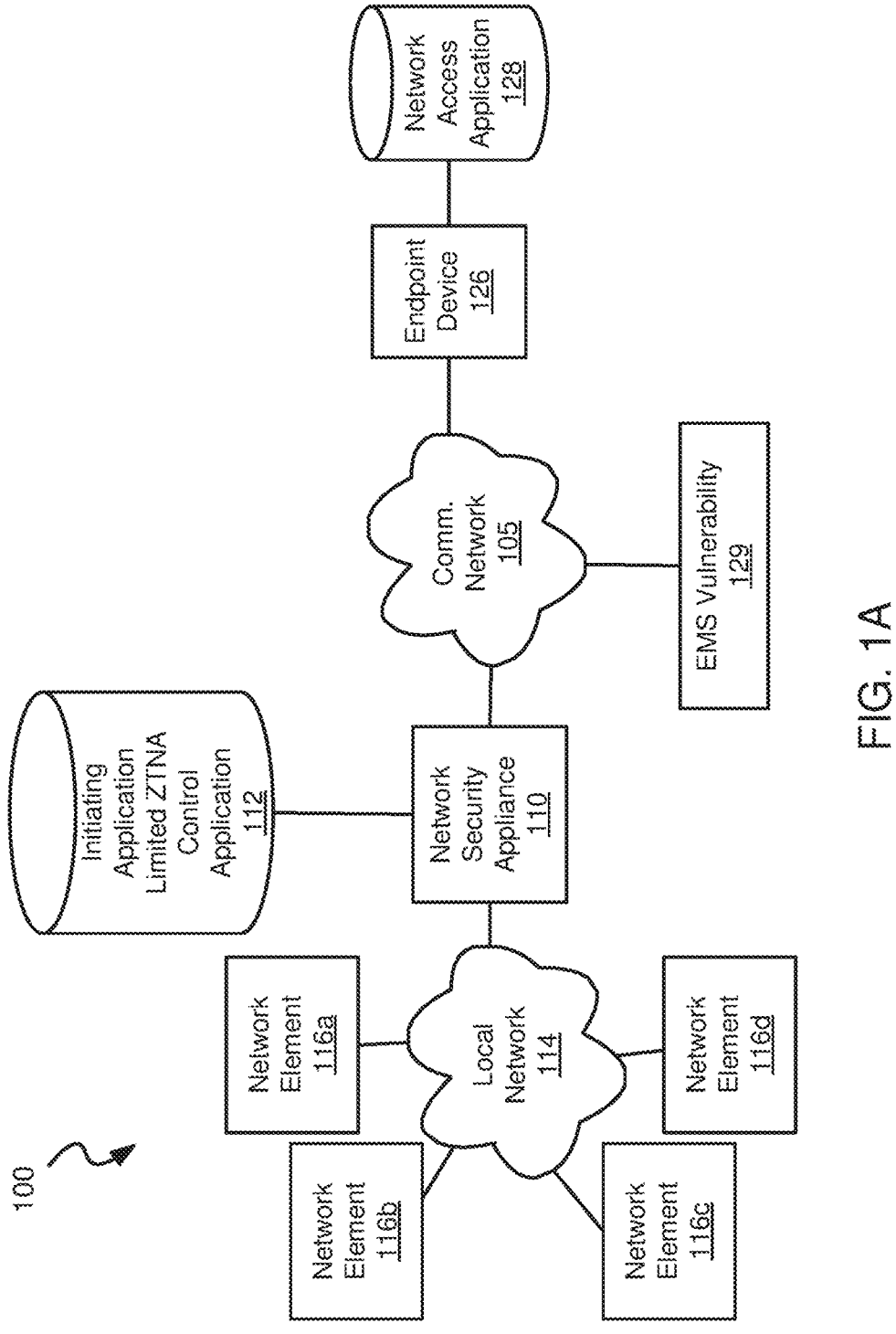

Various embodiments provide systems and methods for providing security in a ZTNA system.

In a typical ZTNA implementation, a client application executing on an endpoint device requests access to a secured network by providing an indication of the user device to a network security appliance set up to protect the secured network. In turn, the network security appliance determines whether the user device identified in the received request is one of the finite number of devices allowed by ZTNA policies programmed into the network security appliance. Where it is one of the allowed devices, a ZTNA tunnel is opened between the endpoint device and the secured network through which network communications are allowed to proceed. It has been found that there is a potential for a malicious actor to gain unauthorized access to the endpoint device and to exploit a vulnerability in any number of client applications running on the endpoint device, which could be used to initiate access to the secure network. In such a case, the network security appliance would allow network communications via a ZTNA tunnel because the user device is recognized as an allowed device.

Various embodiments disclosed herein address this vulnerability by limiting applications on the endpoint device that may be used to initiate a ZTNA tunnel between the endpoint device and the secured network. In some embodiments, a ZTNA tunnel is only allowed when the initiating application on the endpoint device is specifically identified as authorized. Such an approach allows for centralized control of network security at the network security appliance, with user messaging at the user device encouraging the user to change or update their initiating application when a vulnerability of a currently initiating application is identified. In some embodiments, the ZTNA tunnel can be established by any initiating application as long as the particular initiating application is included in an enumerated list of initiating applications and versions maintained in the network security appliance. One initiating applications of a first version number may be included as one entry in the list of initiating applications, and the same initiating application differing by having a second version number may be included as another entry in the list of initiating applications. In such embodiments the same initiating application of different version numbers are different initiating applications. By allowing use of a number of initiating applications, a user is free to choose the particular initiating application that they will use while at the same time providing the previously discussed enhancement to ZTNA network access.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FOR- TISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "network accessible service" "or "network accessible process" may be any service or process accessible via a communication network. As an example, a network accessible service may be an audio communication and/or video communication service such as, for example, Zoom™ that allows two or more end users to communicate over a communication network. As another example, a network accessible service may be a word processing service such as, for example, Office365™. Based upon the disclosure provided herein, one of ordinary skill in the art will recognize a variety of network accessible services and/or network accessible processes that may be used in relation to different embodiments.

The phrase "network access application" may be any application that facilitates communication by an endpoint device to other network elements. Thus, a network access application may be, but is not limited to, an Internet browser, a remote desktop client, a transmission control protocol (TCP) forwarding application such as a soft phone application. Based upon the disclosure provided herein, one of ordinary skill in the art will recognize a variety of network access applications that may be used in relation to different embodiments. The phrase "initiating application" refers to a network access application that is used to initiate or request a network communication.

Example embodiments will now be described more fully hereinafter with reference to the accompanying drawings. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for establishing a zero trust network access (ZTNA) connection that include: receiving, by a processing resource, an encoded ZTNA access information from an endpoint device; decoding, by the processing resource, the ZTNA access information to yield at least an endpoint device identification identifying the endpoint device and an initiating application identification identifying a network access application executing on the endpoint device; determining, by the processing resource, that the endpoint device identification and the initiating application identification are both recognized as authorized to open a ZTNA connection; and based at least in part on determining that the endpoint device identification and the initiating application identification are both recognized as authorized to open the ZTNA connection, establishing, by the processing resource, a ZTNA connection to the endpoint device.

In some instances of the aforementioned embodiments, the network access application is an Internet browser, a transmission control protocol (TCP) forwarding application, and/or a remote desktop client. In some cases, the initiating application identification indicates both the network access application and a version of the network access application. In various cases, the method further includes comparing, by the processing resource, the initiating application with each entry in a list of initiating applications recognized as authorized to open a ZTNA connection.

In various instances of the aforementioned embodiments, the endpoint device identification uniquely identifies the endpoint device. In some instances of the aforementioned embodiments, the processing resource is included in a network security appliance. In various instances of the aforementioned embodiments, the methods further include: based at least in part on determining that at least one of the endpoint device identification or the initiating application identification is not recognized as authorized to open the ZTNA connection, blocking, by the processing resource, the ZTNA connection to the endpoint device; determining, by the processing resource, that the combination of the endpoint device identification and the initiating application identification are within reason notification parameters; and communicating, by the processing resource, a message indicating a reason for blocking the ZTNA connection to the endpoint device.

Other embodiments provide systems for establishing a zero trust network access (ZTNA) connection. Such systems include: a processing resource, and a non-transient computer readable medium coupled to the processing resource. The non-transient computer readable medium has stored therein instructions that when executed by the processing resource to perform the following method: receiving an encoded ZTNA access information from an endpoint device; decoding the ZTNA access information to yield at least an endpoint device identification identifying the endpoint device and an initiating application identification identifying a network access application executing on the endpoint device; determining that the endpoint device identification and the initiating application identification are both recognized as authorized to open a ZTNA connection; and based at least in part on determining that the endpoint device identification and the initiating application identification are both recognized as authorized to open the ZTNA connection, establishing a ZTNA connection to the endpoint device.

Yet other embodiments provide non-transient computer readable media having stored therein instructions that when executed by the processing resource cause the processing to perform the following method: receiving an encoded ZTNA access information from an endpoint device; decoding the ZTNA access information to yield at least an endpoint device identification identifying the endpoint device and an initiating application identification identifying a network access application executing on the endpoint device; determining that the endpoint device identification and the initiating application identification are both recognized as authorized to open a ZTNA connection; and based at least in part on determining that the endpoint device identification and the initiating application identification are both recognized as authorized to open the ZTNA connection, establishing a ZTNA connection to the endpoint device.

Turning to FIG. 1A, network architecture 100 is shown that includes an initiating application limited ZTNA control application 112. In the context of network architecture 100, a number of network elements (e.g., a network element 116a, a network element 116b, a network element 116c, a network element 116d, and an endpoint device 126) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Endpoint device 126 may be any device that is capable of communicating via a communication network. As an example, endpoint device may be a smart phone, tablet device, server, personal computer, or the like. Based upon the disclosure provided herein, one of ordinary skill in the art will recognize a number of endpoint devices that may be used in relation to different embodiments. Endpoint device 126 is coupled to a computer readable storage medium having stored thereon a network access application 128. Network access application 128 is configured to open a ZTNA tunnel between the secured network protected by network security appliance 110 and endpoint device 126. Network access application 128 may be any application executable by endpoint device 126 that is capable of performing network communications including, but not limited to, an Internet browser, a remote desktop application, and/or a TCP forwarding application such as a soft phone.

An element management system (EMS) 129 is included that is capable if identifying applications that have security vulnerabilities, and reporting those vulnerabilities to, for example, network security appliance 110 so that the applications can be updated to a newer version in which the security vulnerability has been corrected.

Access to local network 114 is controlled by network security appliance 110. Network security appliance 110 is coupled to a computer readable storage medium having stored thereon initiating application limited ZTNA control application 112. Initiating application limited ZTNA control application 112 when executed by one or more processors included in network security appliance 110 provides for determining whether to establish a ZTNA tunnel based at least in part on the requesting endpoint device and the initiating application executing on the endpoint device.

Turning to FIG. 1B, an example implementation of a network appliance executing initiating application limited ZTNA control application 130 (e.g., network security appliance 110 executing initiating application limited ZTNA control application 112) is shown in accordance with some embodiments. As shown in this example, initiating application limited ZTNA control application 130 includes: an endpoint device registration update module 132, an initiating application update module 134, a ZTNA request receiving module 136, a ZTNA tunnel establishment module 138, a ZTNA request processing module 140, and an endpoint communication module 142.

Endpoint device registration update module 132 is configured to add and/or delete endpoint devices recognized as authorized to open a ZTNA tunnel with the network protected by the network security appliance. As an example, an endpoint device may be added where a new employee is hired at a company and a user device is assigned to the new employee. The endpoint device may be added by, for example, a system administrator overseeing a network protected by the ZTNA process. Based upon the disclosure provided herein, one of ordinary skill in the art will recognize a variety of other mechanisms that may be used to add an endpoint device in accordance with different embodiments. Where an additional endpoint device is to be added, an endpoint device identification is added to the list of endpoint devices that are recognized as authorized to open a ZTNA tunnel. Any information sufficient to identify the endpoint device when it is requesting to open a ZTNA tunnel may be used in relation to different embodiments. Based upon the disclosure provided herein, one of ordinary skill in the art will recognize a variety of identifications that may be used in relation to different embodiments. Similarly, where a user device is to be deleted, the endpoint device identification is deleted from the list of user devices that are recognized as authorized to open a ZTNA tunnel. In some embodiments, endpoint device registration update module 132 performs the processes discussed below in relation to FIG. 2.

Initiating application update module 134 is configured to facilitate automated and/or manual updating of a list of initiating applications recognized as authorized to open a ZTNA tunnel. For automated updates, initiating application update module 134 updates the list of initiating applications recognized as authorized to open a ZTNA tunnel based at least in part on applications identified as having security vulnerabilities by an EMS system.

Initiating application update module 134 may also receive a request from, for example, a network administrator to add or delete an initiating application or version thereof from the list of initiating applications recognized as authorized to open a ZTNA tunnel. When such a request is received, initiating application update module 134 adds an initiating application indicated in the request to the list of initiating applications recognized as authorized to open a ZTNA tunnel where an add is requested, or deletes an initiating application indicated in the request from the list of initiating applications recognized as authorized to open a ZTNA tunnel where a delete is requested. In some embodiments, initiating application update module 134 performs the functions discussed below in relation to FIG. 3.

ZTNA request receiving module 136 is configured to receive encoded ZTNA information from an endpoint device, to decode the ZTNA information. ZTNA request processing module 140 is configured to extract an endpoint device identification and an initiating application identification from the decoded ZTNA information. In addition, ZTNA request processing module 140 is configured to access both the list of endpoint devices that are recognized as authorized to open a ZTNA tunnel and the list of initiating applications including versions thereof that are recognized as authorized to open a ZTNA tunnel. Further, ZTNA request processing module 140 is configured to compare the endpoint device identification extracted from the decoded ZTNA information with entries in the list of endpoint devices that are recognized as authorized to open a ZTNA tunnel, and to compare the initiating application identification extracted from the decoded ZTNA information with entries in the list of initiating applications that are recognized as authorized to open a ZTNA tunnel. From this comparison, ZTNA request processing module 140 determines whether both the endpoint device identification and the initiating application identification are included in the respective lists to which they were compared.

ZTNA tunnel establishment module 138 is configured to open a requested ZTNA tunnel where both the endpoint device identification and the initiating application identification are included in the respective lists to which they were compared. Any approach know in the art for opening a ZTNA tunnel may be used in relation to the embodiments discussed herein.

Endpoint communication module 142 is configured to determine what communications are to be provided to an endpoint device when a requested ZTNA tunnel is blocked. In some embodiments, endpoint communication module 142 performs the communication determination process discussed below in relation to FIG. 4.

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
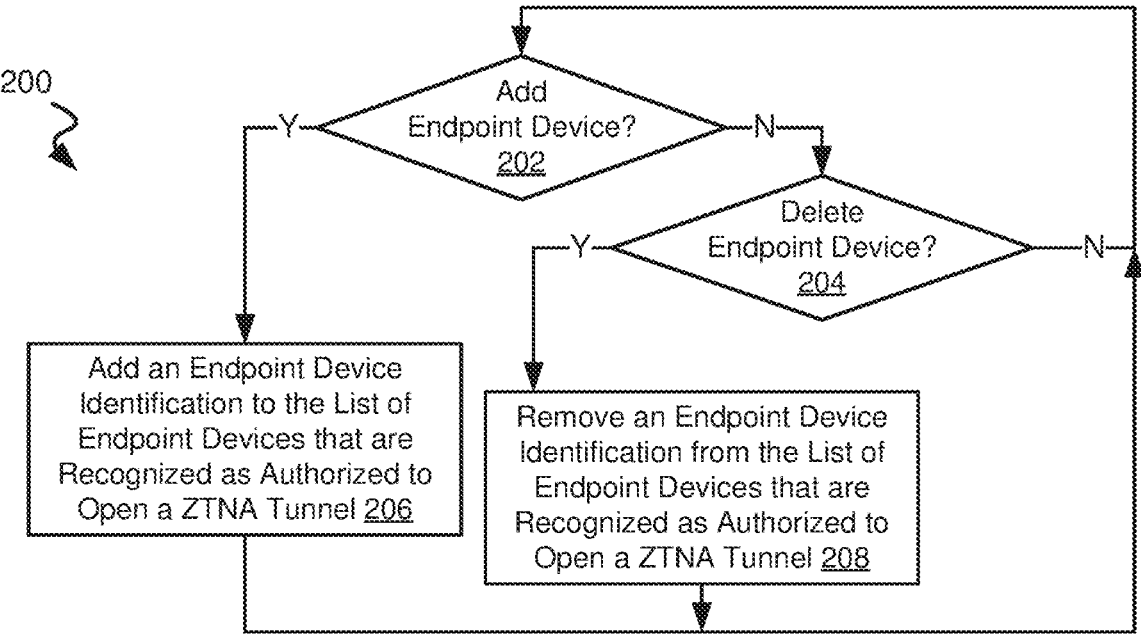
FIG. 2 is a flow diagram showing a method in accordance with some embodiments for updating a list of endpoint devices that are recognized as authorized to open a ZTNA tunnel.

Turning to FIG. 2, a flow diagram 200 shows a method in accordance with some embodiments for updating a list of endpoint devices that are recognized as authorized to open a ZTNA tunnel. Following flow diagram 200, it is determined whether an endpoint device is to be added that is recognized as being authorized to open a ZTNA tunnel (block 202). As an example, an endpoint device may be added where a new employee is hired at a company and a user device is assigned to the new employee. The endpoint device may be added by, for example, a system administrator overseeing a network protected by the ZTNA process. Based upon the disclosure provided herein, one of ordinary skill in the art will recognize a variety of other mechanisms that may be used to add a user device in accordance with different embodiments.

Where an additional endpoint device is to be added (block 202), an endpoint device identification is added to the list of endpoint devices that are recognized as authorized to open a ZTNA tunnel (block 206). Any information sufficient to identify the endpoint device when it is requesting to open a ZTNA tunnel may be used in relation to different embodiments. Based upon the disclosure provided herein, one of ordinary skill in the art will recognize a variety of identifications that may be used in relation to different embodiments.

Alternatively, where no additional endpoint device is to be added (block 202), it is determined whether an endpoint device is to be removed from being recognized as being authorized to open a ZTNA tunnel (block 204). As an example, an endpoint device may be deleted where an employee leaves a company and a user device previously assigned to the new employee is unassigned. The endpoint device may be deleted by, for example, a system administrator overseeing a network protected by the ZTNA process. Based upon the disclosure provided herein, one of ordinary skill in the art will recognize a variety of other mechanisms that may be used to delete a user device in accordance with different embodiments. Where an endpoint device is to be deleted (block 204), an endpoint device identification is deleted from the list of user devices that are recognized as authorized to open a ZTNA tunnel (block 208).

Figure 3:
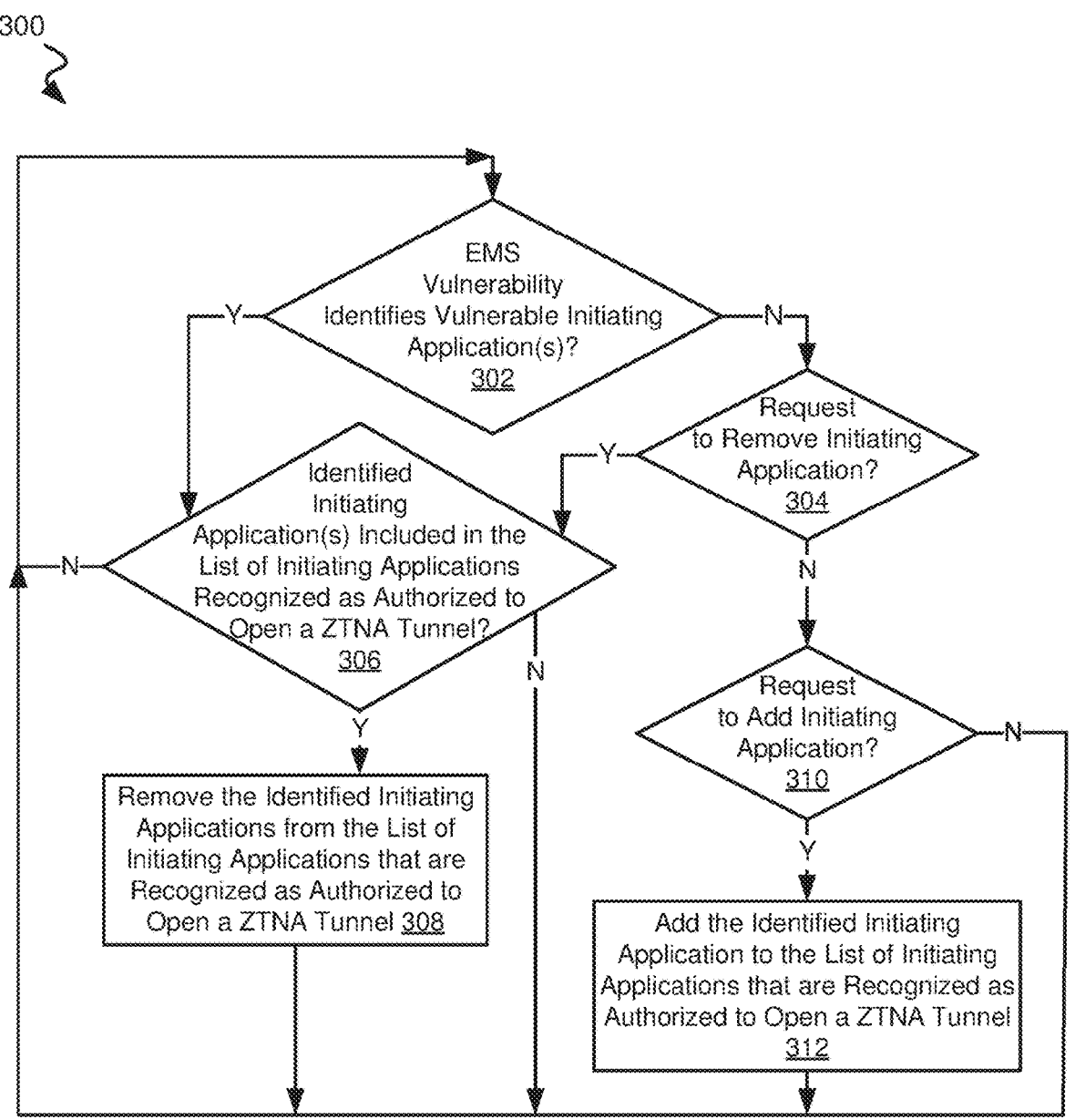
FIG. 3 is a flow diagram showing a semi-automated method in accordance with some embodiments for updating a list of initiating applications that are recognized as authorized to open a ZTNA tunnel.

Turning to FIG. 3, a flow diagram 300 shows a method in accordance with some embodiments for updating a list of initiating applications that are recognized as authorized to open a ZTNA tunnel. Following flow diagram 300, it is determined whether one or more application vulnerabilities have been identified by an element management system (EMS) operating in relation to a network (block 302). Where one or more applications have been identified as having a security vulnerability (block 302), it is determined whether the identified application(s) are included in a list of initiating applications recognized as authorized to open a ZTNA tunnel (block 306). Where one or more applications of the identified initiating applications are included in the list of initiating applications recognized as authorized to open a ZTNA tunnel (block 306), the identified initiating application(s) is/are removed from the aforementioned list (block 308). Alternatively, where none of the identified initiating applications are included in the list of initiating applications recognized as authorized to open a ZTNA tunnel (block 306), the process begins again.

Where no application vulnerabilities have been identified by the EMS (block 302), it is determined whether a request has been received to remove an initiating application from the list of initiating applications recognized as authorized to open a ZTNA tunnel (block 304). Where an initiating application has been identified for removal (block 304), the identified initiating application removed from the list of initiating applications recognized as authorized to open a ZTNA tunnel (block 308) where the requested initiating application is in fact included in the list of initiating applications recognized as authorized to open a ZTNA tunnel (block 306). Manually deleting an initiating application may be done, for example, by a network administrator.

Alternatively, where an initiating application has not been identified for removal (block 304), it is determined whether a request has been received to add an initiating application to the list of initiating applications recognized as authorized to open a ZTNA tunnel (block 310). Where a request to add an initiating application was not received (block 310), the process begins again. Otherwise, the identified initiating application is added to the list of initiating applications recognized as authorized to open a ZTNA tunnel (block 312) and the process begins again. Manually adding an initiating application may be done, for example, by a network administrator.

Figure 4:
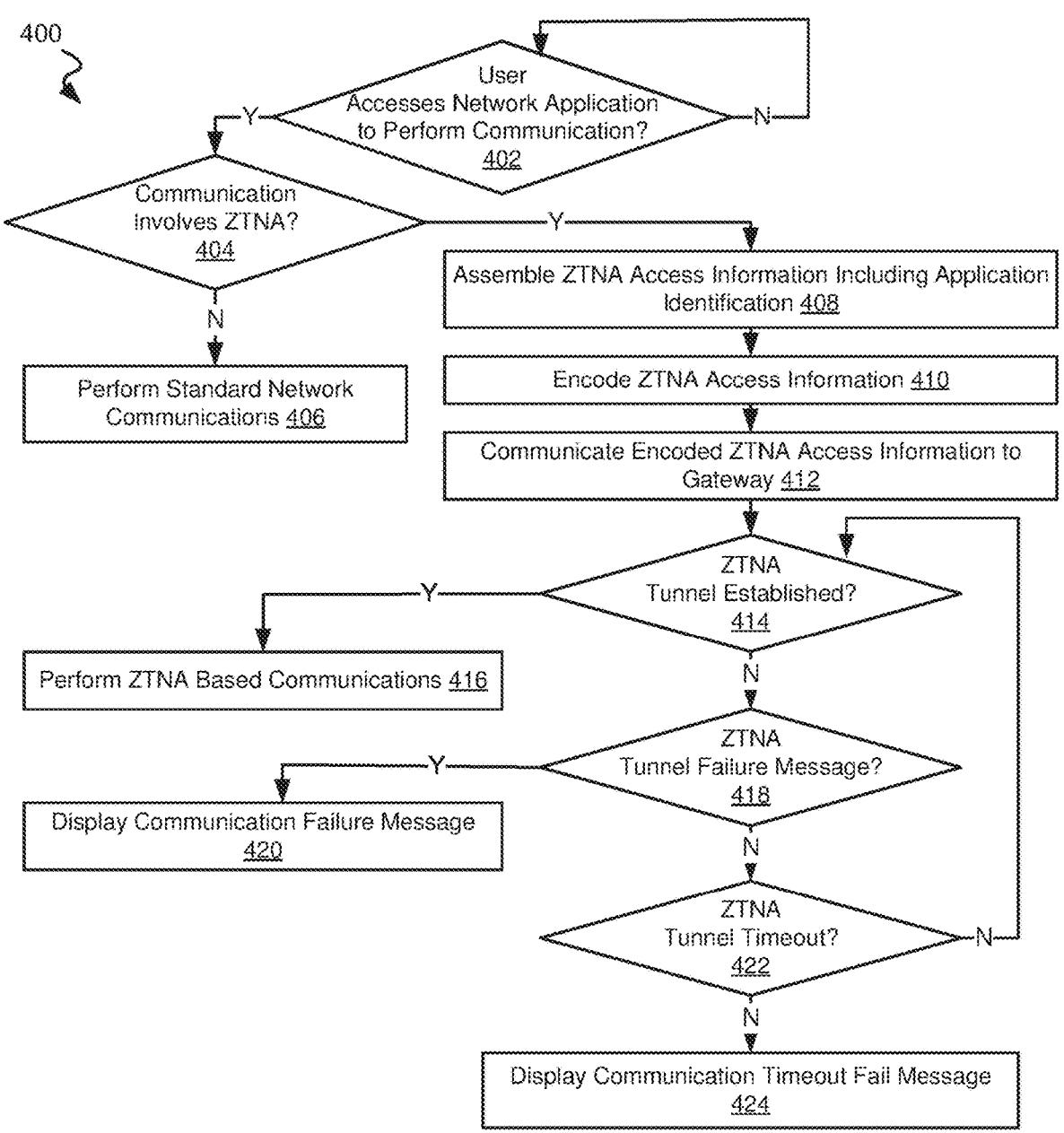
FIG. 4 is a flow diagram showing a method in accordance with some embodiments for initiating a ZTNA tunnel from an endpoint device.

Turning to FIG. 4, a flow diagram 400 shows a method in accordance with some embodiments for initiating a ZTNA tunnel from an endpoint device. Following flow diagram

400, it is determined whether a user has accessed a network access application on an endpoint device to perform a communication over a network (block 402). This may be determined, for example, by determining that a user has attempted to access a uniform record locator (URL) using a network access application such as, for example, an Internet browser. As another example, a user may be determined to access a network access application when they open a soft phone client to initiate a voice and/or video call. Based upon the disclosure provided herein one of ordinary skill in the art will recognize a variety of network access applications and methods for determining user access thereto that may be used in relation to different embodiments.

Where a user has accessed a network access application (block 402), it is determined whether a communication initiated by the access to the network access application involves ZTNA (block 404). Where no ZTNA is involved (block 404), standard network communications are used to perform the requested network communication (block 406).

Alternatively, where ZTNA is involved (block 404), ZTNA access information is assembled (block 408). This ZTNA access information includes an identification of the endpoint device upon which the network access application is executing and an identification of the network access application. The identification of the endpoint device may be any identification that uniquely identifies the endpoint device, and the identification of the network access application may be any identification that describes the application including, but not limited to, an assigned application identifier and version number. Based upon the disclosure provided herein, one of ordinary skill in the art will recognize a variety of combinations of endpoint device and network access application identifications that may be used in relation to different embodiments. The ZTNA access information is encoded (block 410) and communicated to a gateway responsible for authorizing ZTNA access (block 412).

At this juncture, the endpoint device waits for the gateway to establish a ZTNA tunnel based upon the provided ZTNA access information (block 414). Where the ZTNA tunnel is established (block 414), the desired communications are performed via the ZTNA tunnel (block 416). Where the ZTNA tunnel has not yet been opened (block 414), it is determined whether a ZTNA tunnel failure message was received (block 418). In many cases a gateway will not provide a reason for not establishing a ZTNA tunnel and in such cases no message will be received. However, in situations where a reason for not establishing the ZTNA tunnel is received (block 418), the endpoint device displays the received message to a user (block 420). Such a message may be, for example, an indication that the network access application is out of date and needs to be updated.

Where a message indicating a reason for not establishing the ZTNA tunnel is not received (block 418), it is determined whether ZTNA timeout has occurred (block 422). A ZTNA timeout may occur, for example, where a programmed time limit for seeing the ZTNA tunnel established has been exceeded. Where a ZTNA timeout has occurred (block 422), the endpoint device displays a message to the user indicating a communication timeout error (block 424). Otherwise, where a timeout has not occurred (block 422), the processes of blocks 414-422 are repeated.

Figure 5:
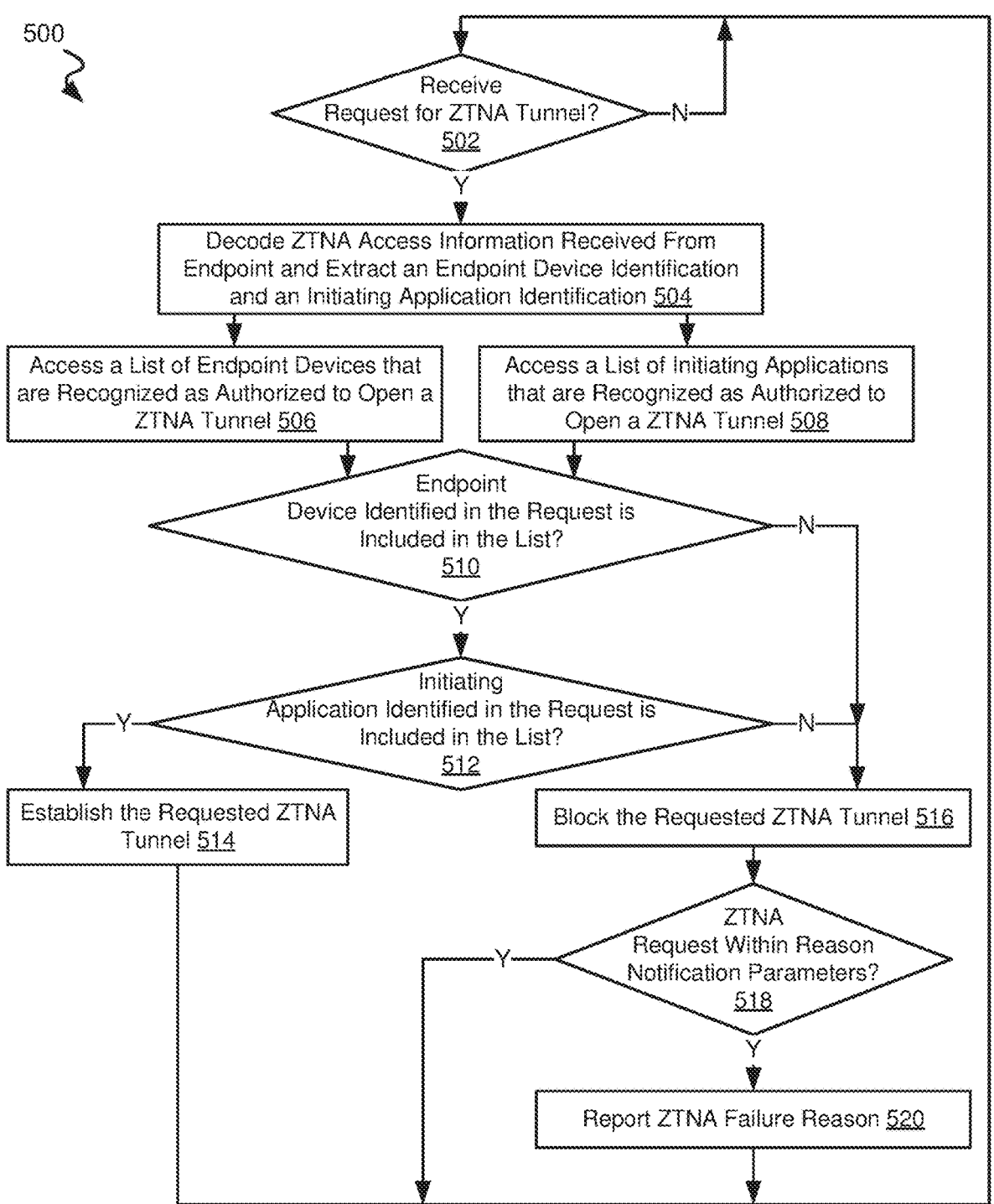
FIG. 5 is a flow diagram showing a method in accordance with some embodiments for establishing ZTNA tunnels based upon a combination of an endpoint device identification and an initiating application identification.

Turning to FIG. 5, a flow diagram 500 shows a method in accordance with some embodiments for establishing ZTNA tunnels based upon a combination of an endpoint device identification and an initiating application identification. Following flow diagram 500, it is determined whether a request to open a ZTNA tunnel has been received (block 502). Such a request to open a ZTNA tunnel includes encoded ZTNA access information provided by an endpoint device. The encoded ZTNA access information is decoded and an endpoint device identification and an initiating device identification are extracted from the decoded ZTNA access information (block 504). In some embodiments the network access application is one of an Internet browser, a transmission control protocol (TCP) forwarding application, and/or a remote desktop client. In some such embodiments, the initiating application identification indicates both a network access application executing on the endpoint device and a version of the network access application. In some cases, the endpoint device identification uniquely identifies the endpoint device.

A list of endpoint devices that are recognized as authorized to open a ZTNA tunnel is accessed (block 506), and a list of initiating applications including versions thereof that are recognized as authorized to open a ZTNA tunnel is accessed (block 508). The endpoint device identification extracted from the encoded ZTNA access information is compared with endpoint device entries in the list of endpoint devices that are recognized as authorized to open a ZTNA tunnel, and the initiating application identification extracted from the encoded ZTNA access information is compared with initiating application entries in the list of initiating applications that are recognized as authorized to open a ZTNA tunnel. From this comparison, it is determined whether both the endpoint device identification and the initiating application identification are included in the respective lists to which they were compared (blocks 510, 512). Where both are found (blocks 510, 512), the requested ZTNA tunnel is established (block 514). Alternatively, where either the endpoint device identification or the remote desktop client identification is/are not found, the requested ZTNA tunnel is blocked (block 516).

Where the requested ZTNA tunnel is blocked (block 516), it is determined whether the ZTNA request was within reason notification parameters (block 518). Reason notification parameters may be a defined set of rules that indicate whether a reason for blocking the requested ZTNA tunnel is to be provided. For example, an endpoint device may be provided a reason for blocking a requested ZTNA tunnel where the endpoint device was found in the list of endpoint devices that are recognized as authorized to open a ZTNA tunnel, but the initiating application identification identified a network access application that was recently removed from the list of initiating applications that are recognized as authorized to open a ZTNA tunnel. In such a case, the endpoint device may be provided a message indicating that the network access application on the endpoint device needs to be either updated to a new version or replaced with an alternative network access application. Based upon the disclosure provided herein, one of ordinary skill in the art will recognize a variety of parameters that may be defined to control whether an endpoint device is provided with a reason for blocking a requested ZTNA tunnel, or not provided with any message. Where the ZTNA request is within reason notification parameters (block 518), a reason message is provided to the endpoint device (block 520). Otherwise no indication of a failure or reason for the failure is provided.

In conclusion, embodiments described herein provide for novel systems, devices, and methods. While detailed descriptions of one or more embodiments have been given above, various alternatives, modifications, and equivalents will be apparent to those skilled in the art without varying from the spirit of the inventive techniques. Therefore, the above description should not be taken as limiting the scope of the appended claims.

What is claimed is:

1. A method comprising:

maintaining, by a network security appliance controlling access to a local network, (i) a list of initiating applications authorized to access the local network and (ii) a list of endpoint devices authorized to access the local network;

receiving, by the network security appliance, a zero trust network access (ZTNA) request from an endpoint device;

extracting, by the network security appliance from the ZTNA request, an endpoint device identification identifying the endpoint device and an initiating application identification identifying a network access application executing on the endpoint device;

based on the list of initiating applications, the list of endpoint devices, the endpoint device identification, and the initiating application identification, selectively allowing or blocking, by the network security appliance, establishment of a ZTNA connection to the endpoint device; and removing, by the network security appliance, a particular initiating application from the list of initiating applications based on identification of an application vulnerability associated with the particular initiating application.

2. The method of claim 1, wherein the network access application comprises an Internet browser, a transmission control protocol (TCP) forwarding application, or a remote desktop client.

3. The method of claim 1, wherein the initiating application identification includes information indicative of both the network access application and a version of the network access application.

4. The method of claim 1, wherein the ZTNA connection comprises a ZTNA tunnel.

5. The method of claim 1, wherein the endpoint device identification uniquely identifies the endpoint device.

6. A system comprising:

one or more processing resources;

a non-transitory computer readable medium coupled to the one or more processing resources and having stored therein instructions that when executed by the one or more processing resources, cause the system to:

maintain (i) a list of initiating applications authorized to access a local network to which access is controlled by the system and (ii) a list of endpoint devices authorized to access the local network;

receive a zero trust network access (ZTNA) request from an endpoint device;

extract from the ZTNA request an endpoint device identification identifying the endpoint device and an initiating application identification identifying a network access application executing on the endpoint device;

based on the list of initiating applications, the list of endpoint devices, the endpoint device identification, and the initiating application identification, selectively establish or block establishment of a ZTNA connection to the endpoint device; and when establishment of the ZTNA connection to the endpoint device has been blocked, communicate a message to the endpoint device indicating a reason for blocking establishment of the ZTNA connection to the endpoint device.

7. The system of claim 6, wherein the network access application comprises an Internet browser, a transmission control protocol (TCP) forwarding application, or a remote desktop client.

8. The system of claim 6, wherein the initiating application identification includes information indicative of both the network access application and a version of the network access application.

9. The system of claim 6, wherein the ZTNA connection comprises a ZTNA tunnel.

10. The system of claim 6, wherein the endpoint device identification uniquely identifies the endpoint device.

11. The system of claim 6, wherein the instructions further cause the system to remove a particular initiating application from the list of initiating applications based on identification of an application vulnerability associated with the particular initiating application.

12. A non-transitory computer readable medium having stored therein instructions that when executed by one or more processing resources of a network security appliance cause the network security appliance to:

maintain (i) a list of initiating applications authorized to access a local network to which access is controlled by the network security appliance and (ii) a list of endpoint devices authorized to access the local network;

receive a zero trust network access (ZTNA) request from an endpoint device;

extract from the ZTNA request an endpoint device identification identifying the endpoint device and an initiating application identification identifying a network access application executing on the endpoint device;

based on the list of initiating applications, the list of endpoint devices, the endpoint device identification, and the initiating application identification, selectively establish or block establishment of a ZTNA connection to the endpoint device; and removing, by the network security appliance, a particular initiating application from the list of initiating applications based on identification of an application vulnerability associated with the particular initiating application.

13. The non-transitory computer readable medium of claim 12, wherein the network access application comprises an Internet browser, a transmission control protocol (TCP) forwarding application, or a remote desktop client.

14. The non-transitory computer readable medium of claim 12, wherein the initiating application identification includes information indicative of both the network access application and a version of the network access application.

15. The non-transitory computer readable medium of claim 12, wherein the endpoint device identification uniquely identifies the endpoint device.

16. The non-transitory computer readable medium of claim 12, wherein the instructions further cause the network security appliance to remove a particular initiating application from the list of initiating applications based on identification of an application vulnerability associated with the particular initiating application.

17. The non-transitory computer readable medium of claim 12, wherein the instructions further cause the network security appliance to, when establishment of the ZTNA connection to the endpoint device has been blocked, communicate a message to the endpoint device indicating a reason for blocking establishment of the ZTNA connection to the endpoint device.

18. The non-transitory computer readable medium of claim 12, wherein the network security appliance is provided as a service in a cloud.

19. The method of claim 1, further comprising when establishment of the ZTNA connection to the endpoint device is blocked, communicating, by the network security appliance, a message to the endpoint device indicating a reason for blocking establishment of the ZTNA connection to the endpoint device.

* * * * *